(12) United States Patent
Boron et al.

(10) Patent No.: US 11,308,721 B2
(45) Date of Patent: Apr. 19, 2022

(54) SYSTEM FOR DETECTING THE FACE OF A DRIVER AND METHOD ASSOCIATED THERETO

(71) Applicant: Aptiv Technologies Limited, St. Michael (BB)

(72) Inventors: Artur Boron, Czernichów (PL); Lukasz Bohdan, Zdzieszowice (PL); Rafal Mucha, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 389 days.

(21) Appl. No.: 16/591,710

(22) Filed: Oct. 3, 2019

(65) Prior Publication Data

US 2020/0110950 A1 Apr. 9, 2020

(30) Foreign Application Priority Data

Oct. 8, 2018 (FR) ...................................... 1871141

(51) Int. Cl.
*G06V 20/59* (2022.01)
*B60K 37/02* (2006.01)
(Continued)

(52) U.S. Cl.
CPC ............ *G06V 20/597* (2022.01); *B60K 37/02* (2013.01); *B60R 11/04* (2013.01); *G06F 3/013* (2013.01); *G06V 10/10* (2022.01); *B60K 2370/20* (2019.05)

(58) Field of Classification Search
USPC ................ 396/51; 382/117; 340/576; 348/78
See application file for complete search history.

(56) References Cited

U.S. PATENT DOCUMENTS 5,461,361 A * 10/1995 Moore ................... B60K 37/02
340/980
6,927,674 B2 8/2005 Harter, Jr. et al.
(Continued)

FOREIGN PATENT DOCUMENTS

EP 1386786 A1 * 2/2004 ............. B60R 11/04
EP 3502953 6/2019
(Continued)

OTHER PUBLICATIONS

"Extended European Search Report", EP Application No. 19202021.2, dated Jan. 20, 2020, 7 pages.
(Continued)

*Primary Examiner* — Kathleen Y Dulaney
(74) *Attorney, Agent, or Firm* — Sawtooth Patent Group PLLC

(57) ABSTRACT

A system for detecting the face of a vehicle driver comprises an instrument cluster for the driver including a carrier and an dashboard directed towards the driver and covered by a glass, said dashboard being embedded in the carrier; an image capture device comprising a camera configured to capture sequential images of the driver's gaze; and a controller configured to analyze the driver's gaze; at least one intrinsic element of the instrument cluster defines a reflecting surface configured to directly reflect the sequential images of the driver's gaze such as a glossy plastic, a chrome-plated element, a display screen or the dashboard glass; the camera comprises a field of view oriented towards the reflecting surface so as to indirectly capture the images of the driver's gaze.

21 Claims, 2 Drawing Sheets

(51) Int. Cl.
*B60R 11/04* (2006.01)
*G06F 3/01* (2006.01)
*G06V 10/10* (2022.01)

(56) References Cited

U.S. PATENT DOCUMENTS

| | | | | |
|---|---|---|---|---|
| 7,330,124 | B2* | 2/2008 | Ota | G06V 40/16 |
| | | | | 340/576 |
| 7,777,778 | B2* | 8/2010 | Scharenbroch | G06V 20/597 |
| | | | | 348/370 |
| 8,218,832 | B2* | 7/2012 | Inada | G06V 40/19 |
| | | | | 382/118 |
| 9,952,666 | B2* | 4/2018 | Sztuk | G06V 40/193 |
| 10,277,837 | B2* | 4/2019 | Madau | G06V 10/147 |
| 2005/0185243 | A1* | 8/2005 | Wenstrand | A61B 5/18 |
| | | | | 340/576 |
| 2007/0014431 | A1 | 1/2007 | Hammoud et al. | |
| 2007/0115099 | A1* | 5/2007 | Hamada | B60R 11/04 |
| | | | | 348/151 |
| 2009/0147080 | A1* | 6/2009 | Inada | G06V 40/19 |
| | | | | 382/100 |
| 2009/0261979 | A1* | 10/2009 | Breed | G01S 15/88 |
| | | | | 340/576 |
| 2010/0245093 | A1* | 9/2010 | Kobetski | H04N 7/18 |
| | | | | 340/576 |
| 2011/0025836 | A1* | 2/2011 | Tamaki | G06T 7/73 |
| | | | | 348/78 |
| 2012/0002028 | A1* | 1/2012 | Takahashi | G06V 10/147 |
| | | | | 348/78 |
| 2012/0150387 | A1* | 6/2012 | Watson | A61B 5/0077 |
| | | | | 701/1 |
| 2014/0097957 | A1* | 4/2014 | Breed | G08B 21/06 |
| | | | | 340/576 |
| 2014/0240478 | A1* | 8/2014 | Nachtegall | B60K 28/06 |
| | | | | 348/77 |
| 2015/0124068 | A1* | 5/2015 | Madau | G06V 10/147 |
| | | | | 29/428 |
| 2015/0138451 | A1* | 5/2015 | Amitai | G02B 27/0179 |
| | | | | 349/11 |
| 2015/0294169 | A1* | 10/2015 | Zhou | A61B 5/18 |
| | | | | 348/148 |
| 2017/0026553 | A1 | 1/2017 | Lee et al. | |
| 2017/0337024 | A1* | 11/2017 | Imanishi | B60K 35/00 |
| 2018/0037116 | A1* | 2/2018 | Avery | B60K 35/00 |
| 2018/0067212 | A1 | 3/2018 | Wilson et al. | |
| 2018/0067245 | A1 | 3/2018 | Giachino et al. | |
| 2018/0079370 | A1 | 3/2018 | Davis et al. | |
| 2018/0164998 | A1* | 6/2018 | Fujita | G06T 3/40 |
| 2018/0204079 | A1* | 7/2018 | Matsumura | G06V 20/597 |
| 2018/0225532 | A1* | 8/2018 | Matsumura | H01J 49/403 |
| 2018/0252917 | A1* | 9/2018 | Takahashi | G02B 27/0101 |
| 2019/0124239 | A1* | 4/2019 | Otomo | B60R 37/02 |
| 2020/0233216 | A1* | 7/2020 | Liesener | B60R 37/06 |
| 2021/0110791 | A1* | 4/2021 | Sadovitch | B60K 35/00 |

FOREIGN PATENT DOCUMENTS

| | | |
|---|---|---|
| EP | 3502953 A1 * | 6/2019 |
| JP | 2018103883 | 7/2018 |
| WO | WO-2019042535 A1 * | 3/2019 |
| WO | WO-2019121114 A1 * | 6/2019 |

OTHER PUBLICATIONS

"Foreign Office Action", EP Application No. 19202021.2, dated Jun. 8, 2021, 4 pages.

* cited by examiner

SYSTEM FOR DETECTING THE FACE OF A DRIVER AND METHOD ASSOCIATED THERETO

CROSS-REFERENCE TO RELATED APPLICATION

This application claims the benefit under 35 U.S.C. § 119(a) of French Patent Application FR 1871141, filed Oct. 8, 2018, the entire disclosure of which is hereby incorporated herein by reference.

TECHNICAL FIELD OF INVENTION

The present invention relates to a system for detecting the face of the driver of a vehicle and the method thereof. More particularly, the invention relates to the capture of the movement of the driver's gaze in order to be able to analyze the gaze behavior.

BACKGROUND OF INVENTION

It is known today to monitor the gaze of a vehicle driver in order to be able to determine, according to the gaze behavior, if the driver remains careful when driving his vehicle. A detection that the driver has fallen asleep or has been distracted can be made using cameras arranged in the vehicle. The on-board cameras in the passenger compartment of the vehicles bring style and assembly constraints when designing and manufacturing the vehicles. It is therefore important to propose a new solution solving these problems.

SUMMARY OF THE INVENTION

According to the invention, a system for detecting the face of a vehicle driver comprises an instrument cluster for the driver including a carrier and a dashboard oriented towards the driver and covered by a glass, said dashboard being embedded in the carrier; an image capture device comprising a camera configured to capture sequential images of the driver's gaze; and a controller configured to analyze the driver's gaze. At least one intrinsic element of the cluster defines a reflecting surface configured to directly reflect the sequential images of the driver's gaze such as a glossy plastic, a chrome-plated element, a display screen or the dashboard glass. The camera comprises a field of view oriented towards the reflecting surface so as to indirectly capture the images of the driver's gaze.

Preferably, the camera can be arranged in the carrier of the dashboard. The reflecting surface can extend along a vertical direction in a concave manner focusing the field of view of the camera towards an optical focus located between the spokes of the vehicle steering wheel so as to minimize the blocking of the field of view by the steering wheel. The concave reflecting surface may be the dashboard glass surface. The controller can be configured to analyze the gaze of the driver according to the vertically inverted images of the gaze.

The detection system may comprise a device for directly illuminating the driver's face comprising a light source configured to illuminate the driver's face and a translucent element arranged between the light source and the driver's face so as to conceal the light source from the driver's gaze. The light source may comprise an infrared source.

According to the invention, a method for detecting the face of a vehicle driver—comprising the detection system described above comprises the steps of:
  positioning the camera comprising a field of view directed towards a reflecting surface of an intrinsic element of the instrument cluster for the driver, the reflecting surface being configured to directly reflect the sequential images of the driver's gaze;
  capturing the reflected sequential images of the driver's gaze from the reflecting surface;
  analyzing the sequential images to determine the behavior of the driver's gaze.

The step of positioning the camera may comprise a step of positioning the camera in the vehicle dashboard carrier so that its field of view is oriented towards the dashboard glass, and the step of capturing the sequential images may be a step of capturing the sequential images reflected by the dashboard glass.

The step of positioning the camera may comprise a step of providing a glass of the dashboard extending vertically in a concave manner and a step of positioning the camera so that its field of view, reflected by the concave surface of the dashboard glass, focuses to an optical focus between the spokes of the steering wheel of the vehicle.

The step of capturing the sequential images may be a step of capturing the vertically inverted sequential images of the driver's gaze.

Other objects and advantages of the present invention will become apparent from the following description.

BRIEF DESCRIPTION OF DRAWINGS

Other features, objects and advantages of the invention will become apparent upon reading the following detailed description, and in relation to the appended drawings, given as a non-limiting example and on which.

DETAILED DESCRIPTION

In order to facilitate the description, and in a non-limiting manner, a vertical axis V is defined. "Bottom", "top", "above", "below", "lower" and "higher" orientations are defined along the vertical direction.

Figure 1:
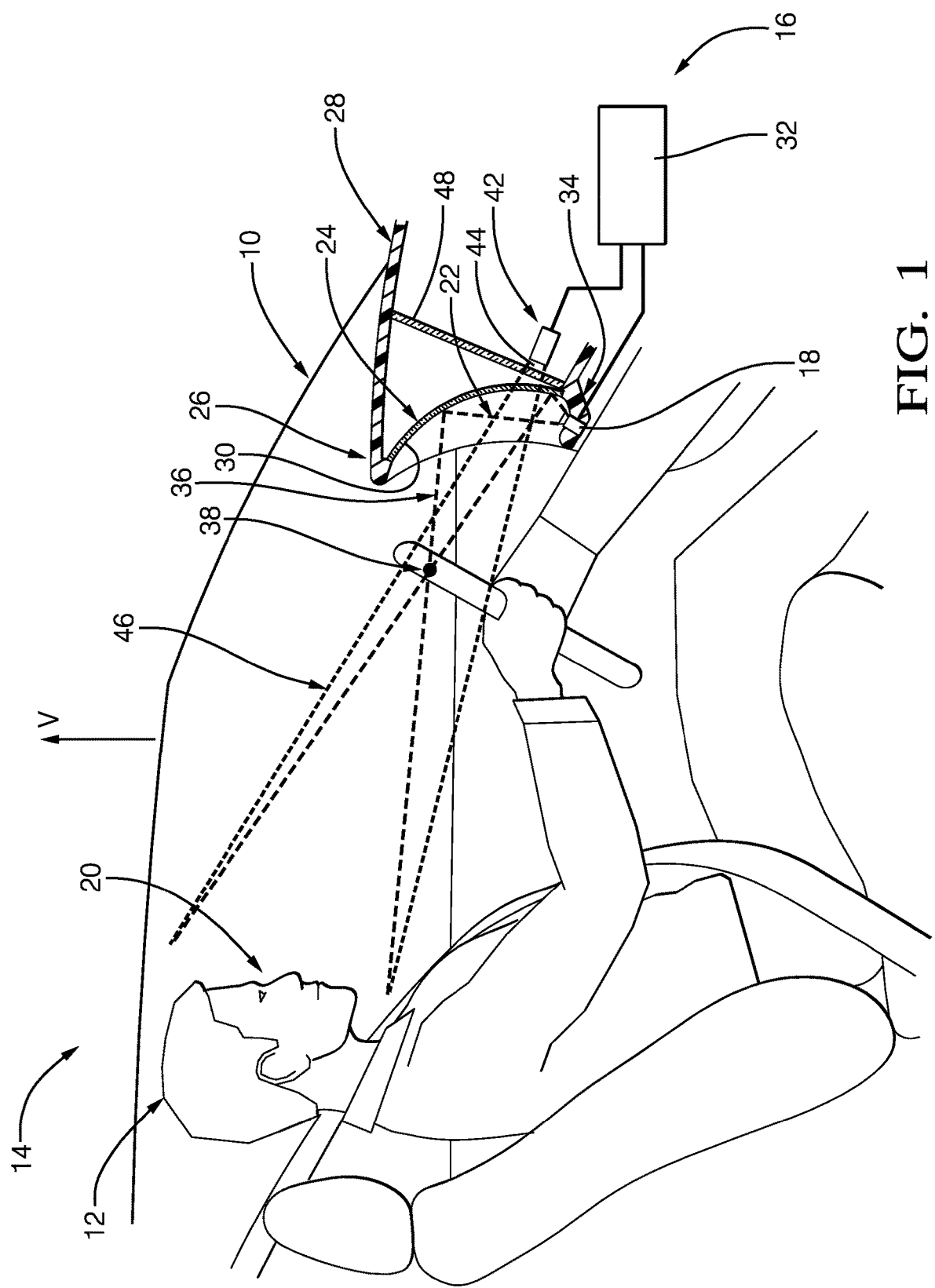
FIG. 1 is a schematic perspective view of the system for detecting the face of a vehicle driver arranged in a vehicle according to one embodiment of the invention.
Figure 2:
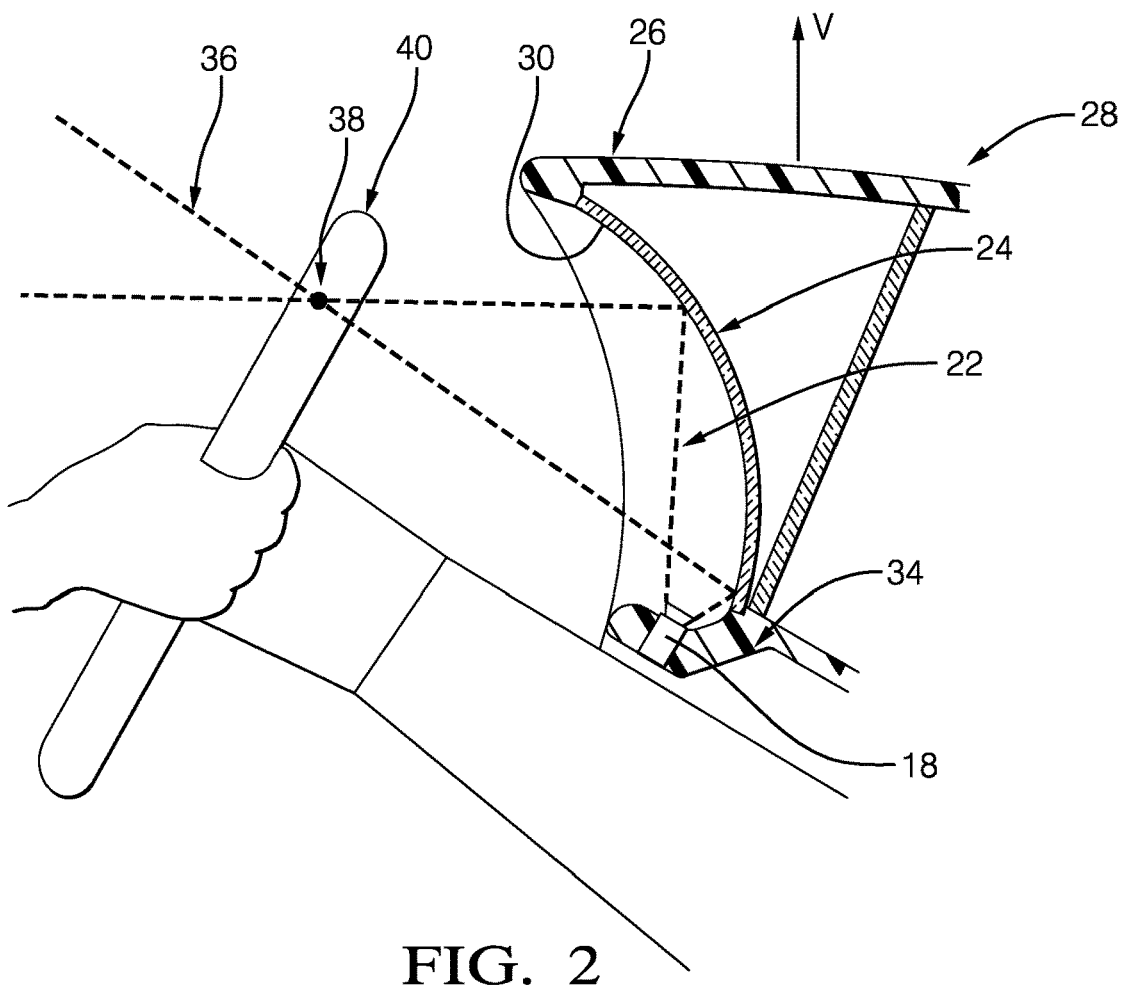
FIG. 2 is an enlarged view of the facial detection system of FIG. 1.

According to FIG. 1 and FIG. 2, a system 10 for detecting the face of a vehicle 14 driver 12 comprises an image capture device 16 comprising a camera 18 configured to capture sequential images of the driver's 12 face. The invention more particularly relates to the detection of the driver's 12 gaze 20 that is to say to the capture of the movement of the pupils so as to be able to analyze the gaze 20. The gaze analysis 20 consists, in a non-limiting manner, in determining the direction of the gaze 20, the distraction of the gaze 20 vis-à-vis obstacles on the path of the vehicle 14, or the falling asleep of the driver 12.

According to FIG. 1, the field of view 22 of the camera 18 is not directly oriented towards the driver's 12 face. The field of view 22 of the camera 18 is oriented towards the glass 24 of the dashboard 26 of the vehicle 14. By dashboard 26 of the vehicle 14 is meant the portion of the instrument cluster 28 generally including inter alia a vehicle speedometer. The glass 24 of the dashboard 26 is generally oriented towards the driver 12 of the vehicle 14 so that, thanks to the physical reflecting properties of the glass 24, the image of the driver's 12 gaze 20 is reflected by the surface 30 of the glass 24. The camera 18 is therefore configured to capture the reflected images on the glass 24 of the dashboard 26.

The image capture device 16 comprises a controller 32 in communication with the camera 18 and configured to analyze the sequence of images captured by the camera 18 so as to be able to analyze the driver's 12 gaze 20.

More generally, according to the invention, the camera 18 must be arranged so that its field of view 22 is oriented towards a reflecting surface of an intrinsic element of the portion of the instrument cluster 28 of the vehicle 14 intended to be accessible by the driver 12. Generally, the portion of the instrument cluster 28 intended to be accessible to the driver 12 comprises, in a non-limiting manner, by way of examples, the dashboard 26, the information indicator lights concerning the state of the vehicle 14 (oil, battery . . . ), the control buttons such as the hazard warning lights, as well as the accessories arranged on the central panel of the instrument cluster 28, that is to say, by way of non-limiting example, the control of the air-conditioning system, the navigation system and the car radio.

In other words, this means that the elements of the instrument cluster 28 not falling within the direct field of view of the driver 12, but for example of the front-passenger of the vehicle 14, cannot be assimilated to a reflecting surface of the driver's gaze 20. As a non-limiting example of elements of the instrument cluster 28 for the driver 12 that may comprise a reflecting surface, in particular the glossy plastic elements oriented towards the driver 12, chrome-plated elements oriented towards the driver 12, an information display screen for the driver 12 or the glass 24 of the dashboard 26 of the vehicle 14 will be mentioned.

The advantage of the invention is in particular the non-necessity, in the indirect detection system, of a mirror-only element only dedicated to the reflection of the image of the driver 12. Moreover, generally such a mirror brings an additional constraint for the appearance of the passenger compartment of the vehicle 14.

In order to conceal the camera, according to the invention, the camera 18 is arranged in the carrier 34 of the instrument cluster 28, more particularly in the part of the carrier 34 at the peripheral boundary of the dashboard 26 of the vehicle 14. The camera 18 is arranged sufficiently close to the glass 24 so that the field of view 22 of the camera 18 generally covers only the part of the dashboard 26 that is vis-à-vis the driver's 12 gaze 20.

According to the particular embodiment, the glass 24 of the dashboard 26 extends in a curved manner along the vertical axis V so that the part of the glass 24 oriented towards the driver 12 has a concave reflecting surface 30. Due to the concave shape of the reflecting surface 30, the reflected field of view 36 of the camera 18 is focused at an optical focus 38. The camera 18 is arranged distant from the glass 24 so that the optical focus 38 is located between the spokes of the steering wheel 40 of the vehicle 14 so as to minimize the blocking of the reflected field of view 36 by the steering wheel 40. The effect of the reflected field of view 36 focusing at a focal point or optical focus 38 is the inversion along the vertical axis V of the reflected image of the driver's 12 gaze 20 on the reflecting surface 30. In other words, the reflection of the driver's 12 face on the glass 24 of the dashboard 26 is a vertically inverted reflection of the driver's 12 face. The controller 32 according to this particular embodiment is therefore configured to analyze the driver's 12 gaze 20 according to the vertically inverted images of the gaze.

In a general manner, a concave reflecting surface of an intrinsic element of the instrument cluster 28 for the driver induces a focusing of the reflected field of view 36 of the camera 18 at an optical focus 38, so that when this optical focus 38 is located between the face of the driver 12 and the reflecting surface, the reflected image is inverted.

According to a particular embodiment, the facial detection system 10 comprises a device 42 for illuminating the driver's 12 face. The illumination device 42 comprises at least one light source 44. As illustrated, the illumination may be a direct illumination according to which the light illuminating the face of the driver 12 propagates from the light source 44 to the face without intermediate element deflecting the light beam 46 from the light source 44. Alternatively, the illumination may be an indirect illumination that is to say through a surface reflecting the light of the device towards the face of the driver 12.

Also in order not to add additional constraints for the appearance of the passenger compartment of the vehicle 14, the light source 44 is not visible to the driver 12. For this purpose, the light source 44 is concealed by a translucent element 48 arranged between the light source 44 and the driver 12. Preferably, the light source 44 is of the infrared source type so as not to dazzle the driver 12 of the vehicle 14.

Figure 3:
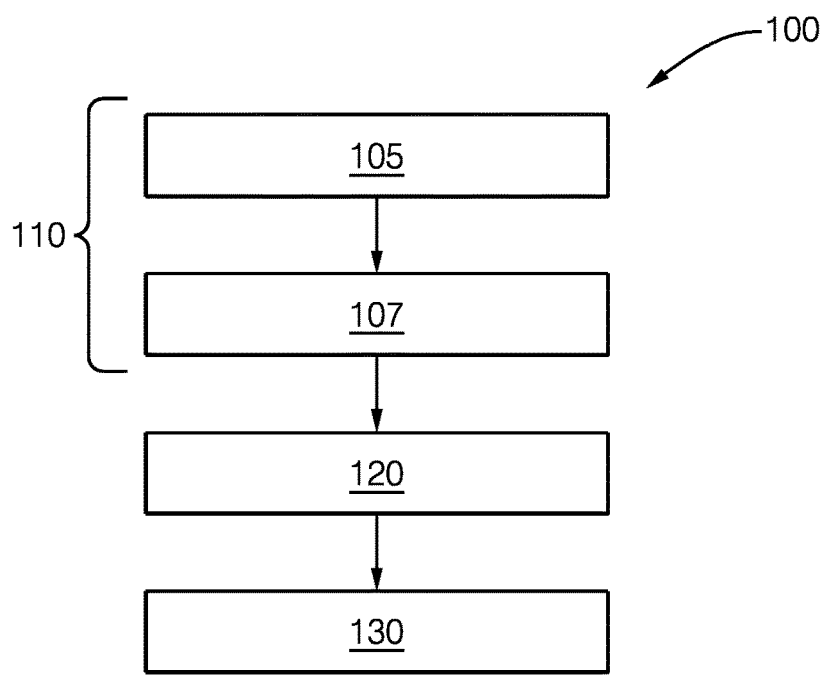
FIG. 3 is a flowchart of a method for detecting the face of a vehicle driver according to one embodiment of the invention.

According to FIG. 3, a method 100 for detecting the face of the driver 12 comprising the detection system 10 described in FIG. 1 comprises a step 110 of positioning the camera 18 so that its field of view 22 is directed towards a reflecting surface 30 of an intrinsic element of the instrument cluster 28 for the driver 12. In order to capture the reflection of the image of the driver's 12 gaze 20, the reflecting surface 30 must be oriented towards the driver's 12 gaze 20. The reflecting surface 30 is therefore configured to directly reflect the sequential images of the driver's 12 gaze 20.

Another step therefore consists in capturing 120 the reflected sequential images of the driver's 12 gaze 20 from the reflecting surface 30 in order to perform a step 130 of analyzing the sequential images of the driver's 12 gaze 20 in order to determine the behavior of the driver's 12 gaze 20.

More particularly, the positioning of the camera 18 is carried out in the carrier 34 of the dashboard 26 of the vehicle 14 so that the field of view 22 of the camera 18 is oriented towards the glass 24 of the dashboard 26. For this purpose, the step of capturing the sequential images is a step of capturing the sequential images reflected by the glass 24 of the dashboard 26.

To take into account the presence of the steering wheel 40 between the dashboard 26 and the driver's 12 gaze 20, the method comprises providing 105 a glass 24 of the dashboard 26 extending vertically in a concave manner so that the reflecting surface 30 of the glass 24 is a concave surface. For this purpose, the camera 18 is arranged 107 so that its field of view 36 reflected by the concave reflecting surface 30 of the glass 24 of the dashboard 26 focuses to an optical focus 38 between the spokes of the steering wheel 40 of the vehicle 14. This focusing at a point of the reflected field of view 36, that is to say the optical focus 38, allows reducing the reflected field of view 36 between the spokes of the steering wheel 40 so as to minimize the risk of blocking of the reflected field of view 36 by the spokes of the steering wheel 40. The reflected field view 36 extending beyond the optical focus 38 towards the driver's 12 gaze 20 returns an inverted reflected image, along the vertical axis V, to the camera 18. The step of capturing the sequential images is a step of capturing the vertically inverted sequential images of the driver's 12 gaze 20.

We claim:

1. A system for detecting a face of a driver of a vehicle comprising:
   an instrument cluster for a vehicle driver including a carrier and a dashboard oriented towards the driver and covered by a glass, said dashboard being embedded in the carrier;
   an image capture device comprising a camera configured to capture sequential images of a driver's gaze; and
   a controller in communication with the image capture device, the controller configured to analyze the driver's gaze; wherein:
      the glass covering the instrument cluster defines a reflecting surface configured to directly reflect the sequential images of the driver's gaze, the reflecting surface extending along a vertical direction in a concave manner focusing a reflected field of view of the camera towards an optical focus located in an opening of a steering wheel of the vehicle;
      the sequential images capture the driver's gaze through the opening of the steering wheel of the vehicle; and
      the camera comprises a field of view oriented towards the reflecting surface so as to indirectly capture images of the driver's gaze.

2. The system according to claim 1, wherein the reflecting surface includes at least one of a glossy plastic, a chrome-plated element, a display screen, and a dashboard glass.

3. The system according to claim 1, wherein the camera is arranged in the carrier of the dashboard.

4. The system according claim 3, wherein the camera is arranged below the instrument cluster.

5. The system according to claim 4 wherein the reflecting surface is a dashboard glass surface.

6. The system according to claim 4, wherein the controller is configured to analyze the driver's gaze according to vertically inverted images of the driver's gaze.

7. The system according to claim 1, wherein the system comprises a device for directly illuminating the face of the driver comprising a light source configured to illuminate the driver's face.

8. The system according to claim 7, wherein the system comprises a translucent element arranged between the light source and the face of the driver so as to conceal the light source from the driver's gaze.

9. The system according to claim 7, wherein the light source comprises an infrared source.

10. A method for detecting a face of a driver of a vehicle, comprising:
    positioning a camera comprising a field of view directed towards a glass covering an instrument cluster for the driver, the glass defining a reflecting surface configured to directly reflect sequential images of a driver's gaze, the reflecting surface extending along a vertical direction in a concave manner focusing the field of view of the camera towards an optical focus located in an opening of a steering wheel of the vehicle, the sequential images capturing the driver's gaze through the opening of the steering wheel of the vehicle;
    capturing, with the camera, reflected sequential images of the driver's gaze from the reflecting surface; and
    analyzing, with a controller in communication with the camera, the reflected sequential images to determine a behavior of the driver's gaze.

11. The method according to claim 10, wherein the step of positioning the camera comprises a step of positioning the camera in a vehicle dashboard carrier so that the field of view of the camera is oriented towards a dashboard glass; wherein
    the step of capturing the reflected sequential images includes a step of capturing, with the camera, the sequential images reflected by the dashboard glass.

12. The method according to claim 10, wherein the camera is arranged below the instrument cluster.

13. A method of operating a detection system, comprising:
    capturing an image of a face of a driver of a vehicle, with an image capture device; the image capture device comprising a camera configured to capture sequential images of a driver's gaze, the camera positioned in a carrier of an instrument cluster, the instrument cluster including a dashboard oriented towards the driver and covered by a glass, the dashboard being embedded in the carrier; and
    analyzing the driver's gaze, with a controller in communication with the image capture device; wherein:
      the glass covering the instrument cluster defines a reflecting surface configured to directly reflect the sequential images of the driver's gaze, the reflecting surface extending along a vertical direction in a concave manner focusing a reflected field of view of the camera towards an optical focus located in an opening of a steering wheel of the vehicle;
      the sequential images capture the driver's gaze through the opening of the steering wheel of the vehicle; and
      the camera comprises a field of view oriented towards the reflecting surface so as to indirectly capture the sequential images of the driver's gaze.

14. The method according to claim 13, wherein the reflecting surface includes at least one of a glossy plastic, a chrome-plated element, a display screen, and a dashboard glass.

15. The method according to claim 13, wherein the camera is arranged in the carrier of the dashboard.

16. The method according to claim 15, wherein the camera is arranged below the instrument cluster.

17. The method according to claim 16 wherein the reflecting surface is a dashboard glass surface.

18. The method according to claim 16, wherein the controller is configured to analyze the driver's gaze according to vertically inverted images of the driver's gaze.

19. The method according to claim 13, wherein the detection system comprises a device for directly illuminating the face of the driver comprising a light source configured to illuminate the driver's face.

20. The method according to claim 19, wherein the detection system comprises a translucent element arranged between the light source and the face of the driver so as to conceal the light source from the driver's gaze.

21. The method according to claim 19, wherein the light source comprises an infrared source.

* * * * *